(No Model.)

M. G. SHAW.
ANIMAL TRAP.

No. 440,336. Patented Nov. 11, 1890.

Witnesses:
Samuel Kit
W. S. Duvall

Inventor
Moses G. Shaw.
By his Attorneys,
C. A. Snow & Co.

UNITED STATES PATENT OFFICE.

MOSES G. SHAW, OF FRANKLIN FALLS, NEW HAMPSHIRE.

ANIMAL-TRAP.

SPECIFICATION forming part of Letters Patent No. 440,336, dated November 11, 1890.

Application filed April 26, 1890. Serial No. 349,671. (No model.)

*To all whom it may concern:*

Be it known that I, MOSES G. SHAW, a citizen of the United States, residing at Franklin Falls, in the county of Merrimac and State of New Hampshire, have invented a new and useful Animal-Trap, of which the following is a specification.

This invention has relation to spring-jaw traps for the capturing of small animals, such as rats, mice, and other animals of that class.

The objects of the invention are to provide an exceedingly-simple, cheaply-constructed, and powerful trap, the principal component parts of which are constructed of wire.

With the above general and other minor objects in view the invention consists in certain features of construction, hereinafter specified, and particularly pointed out in the claims.

Figure 1:
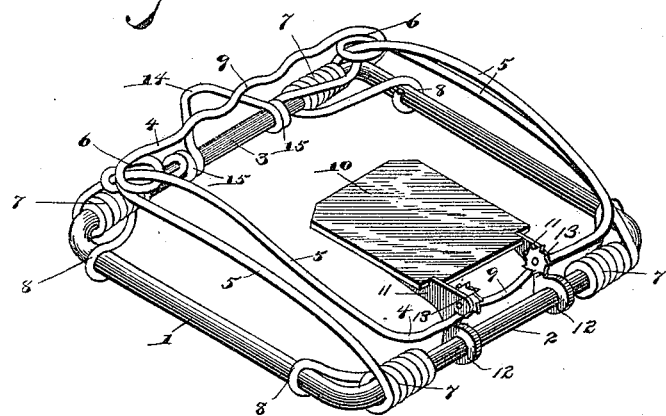
Figure 2:
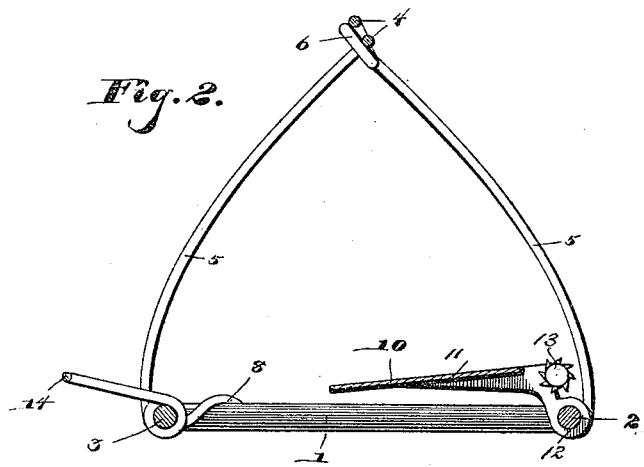
Figure 3:
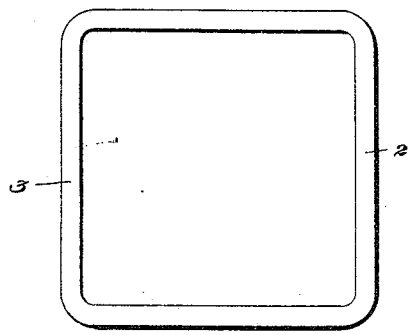

Referring to the drawings, Figure 1 is a perspective of a trap constructed in accordance with my invention, the same being set. Fig. 2 is a longitudinal vertical section, the trap being sprung. Fig. 3 is a detail in plan of the base.

Like numerals of reference indicate like parts in all the figures of the drawings.

The base 1 is rectangular in plan and formed of a single piece of heavy wire bent to the desired shape and forming the two side bars 2 and end bars 3.

The jaws 4 are formed of lighter spring-wire, and, after having been bent at each side of their center to form parallel terminals 5, one of said jaws at its bent portions is provided with a pair of opposite coils or eyes 6, which receive and form a passage for the opposite terminals of the companion-jaw, so that said jaws are linked together against separation. After forming the jaws each terminal of each jaw is coiled loosely around its respective side bar, as at 7, and the extremity of the terminal deflected to one side and clinched over the adjacent end bar, as shown at 8. This completes the two jaws, which, by reason of the coils formed on the side bars, have a tendency toward each other at their free ends, which between their bends I prefer to provide with kinks 9, in order that they may readily grasp the body of the animal in an uneven manner and prevent the animal from slipping between the jaws.

The bait-pan 10 is supported upon a pair of arms 11, the outer ends of which are provided with eyes 12, loosely mounted upon the side bar 2, between the coiled terminals of one of the jaws 4. The upper outer corners of the arms have journaled therein a pair of loose toothed or ratchet wheels 13.

14 represents an eye or bail, to which may be attached a chain or rope. This eye or bail is located upon that side bar opposite to which is pivoted the bait-pan, and is also formed of wire, the blank of the bail being curved gradually upon itself, coiled about the side bar, as at 15, and the extremities of the terminal oppositely disposed and given one or more twists about the terminals of the adjacent jaw.

To set the trap, it is simply necessary to separate the free ends of the two jaws, depressing the same until in contact with their coils, or nearly so, and until the opposite jaw at its transverse bar takes under the ratchet-wheels of the bait-pan. When the jaws are in position, the bait-pan is elevated, the transverse bar of the jaw being opposite the vertical diameter of the journals of the wheels, and is thus maintained locked in a depressed position, and by reason of the passage of the one jaw through the eyes of the opposite jaw said companion-jaw is likewise locked.

From this description of the construction of trap it is apparent that the weight of an animal upon the bait-pan or any portion of its weight will cause wheels to partially rotate, which liberates the locking-jaw, will, with the companion-jaw, be thrown with great force by the spring-coils toward each other, and will thus tightly embrace any object between the extremities of the jaws.

It will be apparent from the above description that the entire device, with the exception of the bait-pan, is cheaply constructed and in a simple manner from ordinary spring-wire, the numerous coils of the trap requiring no special machinery, but being readily accomplished by ordinary hand-tools.

Having thus described my invention, what I claim is—

1. In a trap of the class described, a base having opposite side bars, in combination with opposite spring-jaws, each formed of a single piece of wire bent to form a rectangular jaw having opposite terminals, one of said jaws being provided with opposite eyes for the reception of the terminals of the opposite jaw, the terminals of each jaw being loosely coiled about the side bars of the base and having their ends secured to said base, a bait-pan located within the base and having a pair of rigid arms projecting therefrom and supporting the bait-pan, and toothed wheels mounted upon the outer ends of the arms and adapted to be engaged by that one of the jaws the terminals of which pass through the eyes of the opposite jaw, substantially as specified.

2. In a trap of the class described, a rectangular base formed of heavy wire and comprising opposite side and end bars, in combination with opposite jaws formed of spring-wire, the terminals of the jaws being loosely coiled around the side bars of the base, and bait-pan-supporting arms loosely mounted upon one of the side bars and terminating in ratchet-wheels for engaging one of the jaws, substantially as specified.

In testimony that I claim the foregoing as my own I have hereto affixed my signature in presence of two witnesses.

MOSES G. SHAW.

Witnesses:
FRANK N. PARSONS,
S. F. DANFORTH.